United States Patent [19]

Shin

[11] Patent Number: 5,930,527
[45] Date of Patent: Jul. 27, 1999

[54] APPARATUS FOR RESETTING A MODEM WITH A VARIETY OF ADDITIONAL FUNCTIONS

[75] Inventor: Seong-Kee Shin, Kyungki-do, Rep. of Korea

[73] Assignee: SamSung Electronics Co., Ltd., Kyungki-do, Rep. of Korea

[21] Appl. No.: 08/814,883

[22] Filed: Mar. 12, 1997

[30] Foreign Application Priority Data

Mar. 13, 1996 [KR] Rep. of Korea .......................... 96-6643

[51] Int. Cl.⁶ ....................................................... H04B 1/38
[52] U.S. Cl. ............................................ 395/892; 375/222
[58] Field of Search ................................ 395/834, 892, 395/882, 883, 884, 891, 893, 840, 841, 863; 379/93.28; 327/143; 368/228; 375/222

[56] References Cited

U.S. PATENT DOCUMENTS

| | | | |
|---|---|---|---|
| 4,385,392 | 5/1983 | Angell et al. ........................ | 340/825.01 |
| 4,670,676 | 6/1987 | Nashitani ................................ | 327/143 |
| 4,811,358 | 3/1989 | Smedley et al. ........................ | 375/222 |
| 4,928,305 | 5/1990 | Yui ........................................ | 379/93.28 |
| 5,050,041 | 9/1991 | Shafi ...................................... | 361/686 |
| 5,157,270 | 10/1992 | Sakai ...................................... | 307/66 |
| 5,241,402 | 8/1993 | Aboujaoude et al. ................... | 358/406 |
| 5,408,614 | 4/1995 | Thornton et al. ....................... | 395/841 |
| 5,457,660 | 10/1995 | Ito .......................................... | 365/228 |
| 5,537,654 | 7/1996 | Bedingfield et al. .................... | 395/834 |
| 5,564,010 | 10/1996 | Henry et al. ........................... | 395/182.2 |
| 5,574,943 | 11/1996 | Daftari ................................... | 395/821 |
| 5,615,390 | 3/1997 | Kurahara ................................ | 395/834 |
| 5,828,697 | 10/1998 | Shin ....................................... | 375/222 |

Primary Examiner—Christopher B. Shin
Attorney, Agent, or Firm—Robert E. Bushnell, Esq.

[57] ABSTRACT

A reset circuit of a modem which permits the exchange of digital data with a remote modem in a computer system having an external reset switch provided thereon for allowing a user to reset the modem. The reset circuit includes a decoder section for receiving information from the computer system and decoding the same information to generate a first reset signal; and a signal output section having a first input terminal coupled to receive occurrence of the first reset signal, and a second input terminal coupled to receive occurrence of a second reset signal generated from the computer system in response to either manual depression of the external reset switch or an execution of a designated program contained in the computer system, for combining occurrence of the first reset signal and the second reset signal to generate a modem reset signal to a reset portion of the modem for resetting operation of the modem.

20 Claims, 3 Drawing Sheets

APPARATUS FOR RESETTING A MODEM WITH A VARIETY OF ADDITIONAL FUNCTIONS

CLAIM FOR PRIORITY

This application makes reference to, incorporates the same herein, and claims all benefits accruing under 35 U.S.C. §119 from an application for An Apparatus For Resetting A Modem With A Variety Of Additional Functions earlier filed in the Korean Industrial Property Office on Mar. 13. 1996, and there duly assigned Ser. No. 96-6643.

BACKGROUND OF THE INVENTION

1. Technical Field

The present invention relates to a modem which permits the exchange of digital data with a remote modem, and more particularly, relates to an especially designed reset circuit for a modem with a variety of additional functions such as facsimile function, voice function, or combined facsimile and voice function, etc.

2. Related Art

Conventional modem is known as a data communication adapter comprising a modulator-demodulator for telephone network communication between data terminals such as computer systems. Exemplary configurations are disclosed, for example, in U.S. Pat. No. 4,085,449 for Digital Modem issued to Walsh, and U.S. Pat. No. 4,811,358 for Subscriber Line Interface Modem issued to Smedley et al. Modems for personal computer applications are currently available in two general types: (1) an internal modem typically contained on a single printed circuit board and adapted to be inserted into an expansion slot providing within the computer housing such as disclosed in U.S. Pat. No. 5,134,648 for Reconfigurable Modem For A Computer Or The Like issued to Hochfield; and (2) an external modem having its own power supply and connected to an input/output (I/O) port of the computer.

Generally, modem is intended for data communication between computer systems such that a separate reset circuit is not included to reset the modem for different data transfer rates so as to minimize production cost. Usually, internal modem is conveniently disposed within the computer housing and need not include its own power supply. However, it has disadvantages in that it provides no visual display of modem activity and requires that the entire computer including the modem be shut down and rebooted in the case of a modem jam. In contrast, the external modem includes one or more indicators displaying the modem activity and is provided with a separate on/off control switch for turning on/off the modem independently from the computer so that the modem can be rebooted separately from the computer in case of a modem jam. The disadvantages of the external modem is that it requires the provision of an AC adapter, external cabling for connection to the computer and an extra serial I/O port even when not in use. Recent efforts such as disclosed in U.S. Pat. No. 5,050,041 for Modem Mountable In Wall Of A Computer Housing With Readily Accessible On/Off Switch Connecting Either Modem Or An Auxiliary Serial Port To An I/O Port issued to Shafi, have been made to provide a hybrid configured modem suitable for mounting in a computer slot but retaining communication indicators and an on/off switch that is readily accessible to the user. No reset circuit is, however, provided to reset operation of the modem. U.S. Pat. No. 5,828,697 for Modem Having External Reset Circuit issued to Seong-Kee Shin discloses a reset circuit for a modem only.

Recent advanced modem having multiple modem functions including a facsimile function, a voice function, a simultaneous voice and data function (SVD) in addition to the original digital data exchange function, however, requires some reset schemes for initializing operation of the modem for the exchange of digital data in one of a basic modem mode and an additional modem mode at different data transfer rates. Examples of such a modem are disclosed in U.S. Pat. No. 5,295,156 for Modem issued to Heep et al., U.S. Pat. No. 5,384,780 for High Speed Modem, Method And System For Achieving Synchronous Data Compression issued to Lomp, and U.S. Pat. No. 5,537,654 for System For PCMCIA Peripheral To Execute Instructions From Shared Memory Where The System Reset Signal Causes Switching Between Modes Of Operation By Alerting The Starting Address issued to Bedingfield. In Bedingfield '654, for example, the subscriber line interface modem is reset in response to a reset signal generated from the computer's CPU. When the modem having multiple functions operates in a voice function, however, an internal reset command is not generated, and consequently, power must be applied to the modem again or the computer must be rebooted in order to reset the modem for different modem functions at different data transfer rates. It has been my observation that longer time is necessary to reset a modem having multiple modem functions. Moreover, the modem of this type can only be reset by way of the computer. Thus, if the computer is malfunctioned, the modem can not be rapidly changed into a basic modem mode for the exchange of digital data. The computer must be re-started by warm or cold booting in order that the modem is reset to be set in the basic modem mode. If the computer is operating normally, however, the user must operate the computer in accordance with a reversely setting sequence of an additional modem function in order that the modem is changed from any one of additional modem functions to a basic modem mode. As a result, the modem cannot be rapidly restored from any additional modem mode into a basic modem mode.

SUMMARY OF THE INVENTION

Accordingly, it is therefore an object of the present invention to provide an especially designed reset circuit for a modem in a computer system.

It is also an object to provide an improved reset circuit for resetting operation of a modem in which, when a user requires a basic modem function for the exchange of digital data, an additional modem function being performed therein is rapidly restored in the basic modem function.

It is another object of the present invention to provide a reset apparatus for a modem in which, if there is an occurrence of an error in an operation system program of a computer system, a specific program being performed for the modem is stopped immediately to rapidly restore in a basic modem function for the exchange of digital data.

These and other objects of the present invention can be achieved by an especially designed reset circuit for a modem operable in one of a basic modem mode for an exchange of digital data and an additional modem mode for an exchange of specific data in a computer system having an external reset switch provided thereon for allowing a user to manually reset operation of the modem. The reset circuit includes a decoder section for receiving information from the computer system and decoding the same information to generate a first reset signal; and a signal output section having a first input terminal coupled to receive occurrence of the first reset signal, and a second input terminal coupled to receive occurrence of a second reset signal generated from the computer system in response to one of manual depression of the external reset switch and execution of a designated program contained in the computer system, for combining occurrence of the first reset signal and the second reset signal to generate a modem reset signal to a reset portion of the modem for resetting operation of the modem. It is a further object of the present invention to provide a reset circuit and method for applying the same function in a personal computer in which it is difficult to install a switch for modem only.

In accordance with one aspect of the present invention, the decoder section includes a first decoder having input ports coupled to receive address signals from the computer system, for decoding the same address signals to produce an enable signal; and a second decoder having input ports coupled to receive modem function selection signals from the computer system and the enable signal from the first decoder, for decoding the same modem function selection signals upon activation of the enable signal to produce the first reset signal. The signal output section includes an OR gate for logically combining the first and second reset signals to produce the modem reset signal to the reset port of the modem. A delay circuit may be provided between the decoder section and the signal output section to delay the first reset signal for purposes of synchronizing the modem reset signal with a specific reset active time of the modem.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
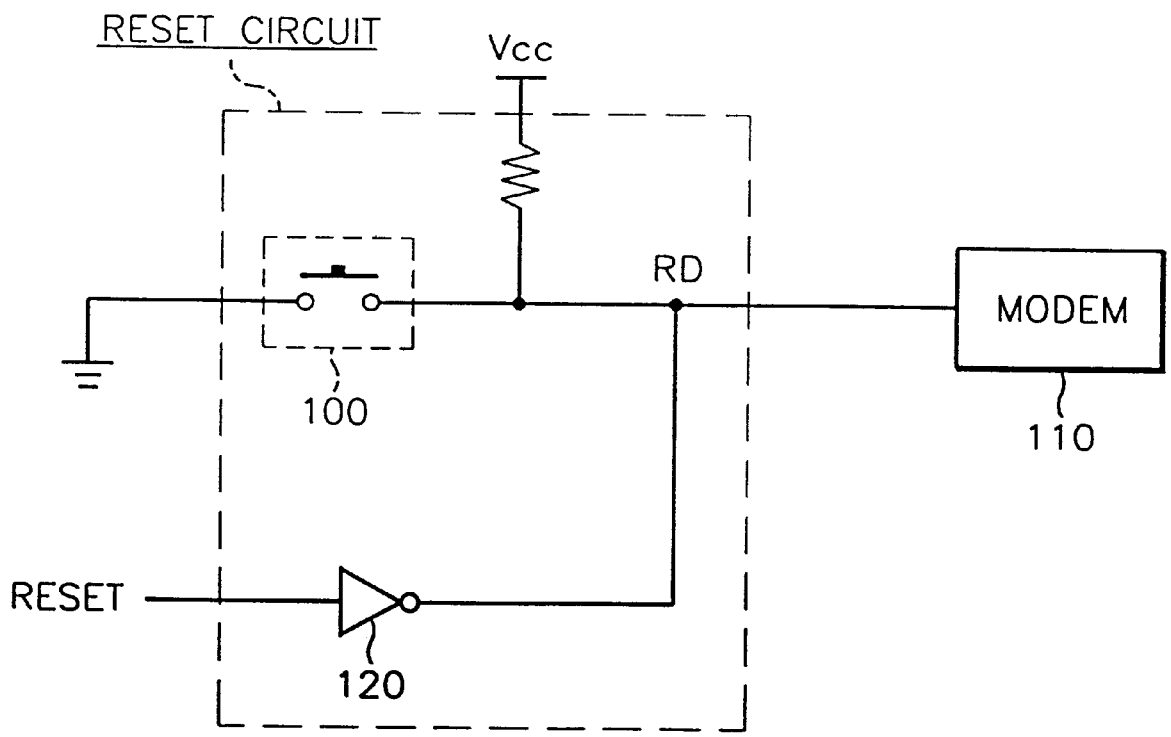
FIG. 1 is a circuit diagram of a reset circuit for a personal computer having a modem.

Referring now to the drawings and particularly to FIG. 1, which illustrates a reset circuit for a computer system having a modem with a variety of additional modem functions. The reset circuit is located outside the modem 110 and includes a reset switch 100 provided on a front or side panel of a personal computer for allowing a user to reset operation of the personal computer, and an inverter 120 coupled to receive a reset signal RESET generated from the personal computer in accordance with a program contained in the personal computer for generating an inverted response to a reset port of the modem 110. The reset switch 100 also generates another reset signal upon a manual depression of the reset switch 100. When the reset signal RESET from the personal computer or another reset signal from the reset switch 100 is applied to the reset port of the modem 110, the modem 110 stops an additional modem mode or a specific program being executed and switches back to a basic modem mode for the exchange of digital data.

If the modem 110 is malfunctioned even during the normal operation of the personal computer, the modem 110 must be reset by the depression of the reset switch 100 on the personal computer. When the reset switch 100 is depressed, the modem 110 is initialized to be restored back in a basic modem mode for the exchange of digital data. However, to initialize the modem 110, the computer must be previously initialized. However, the computer requires time to be normally operated and thereafter to enable the modem to be set in a basic modem mode. Moreover, since the reset signal RESET is not generated from the computer when the computer is malfunctioned, the modem 110 can not be restored in the basic modem mode. In this case, the modem 110 can be reset only by the reset switch 100 of the personal computer.

In the reset circuit as shown in FIG. 1, there arises a problem that any one of additional modem functions being performed in the modem can not be rapidly changed into a basic modem mode for the exchange of digital data, when the computer is malfunctioned. During the mal-operation of the computer, the computer must be re-started by warm or cold booting in order that the modem is reset to be set in a basic modem mode.

During the normal operation of the computer, the user must operate the computer in accordance with a reversely setting sequence of an additional modem function in order that the modem is charged from any one of additional modem functions to a basic modem mode. As a result, the modem can not be rapidly restored from any additional modem mode into a basic modem mode.

Figure 2:
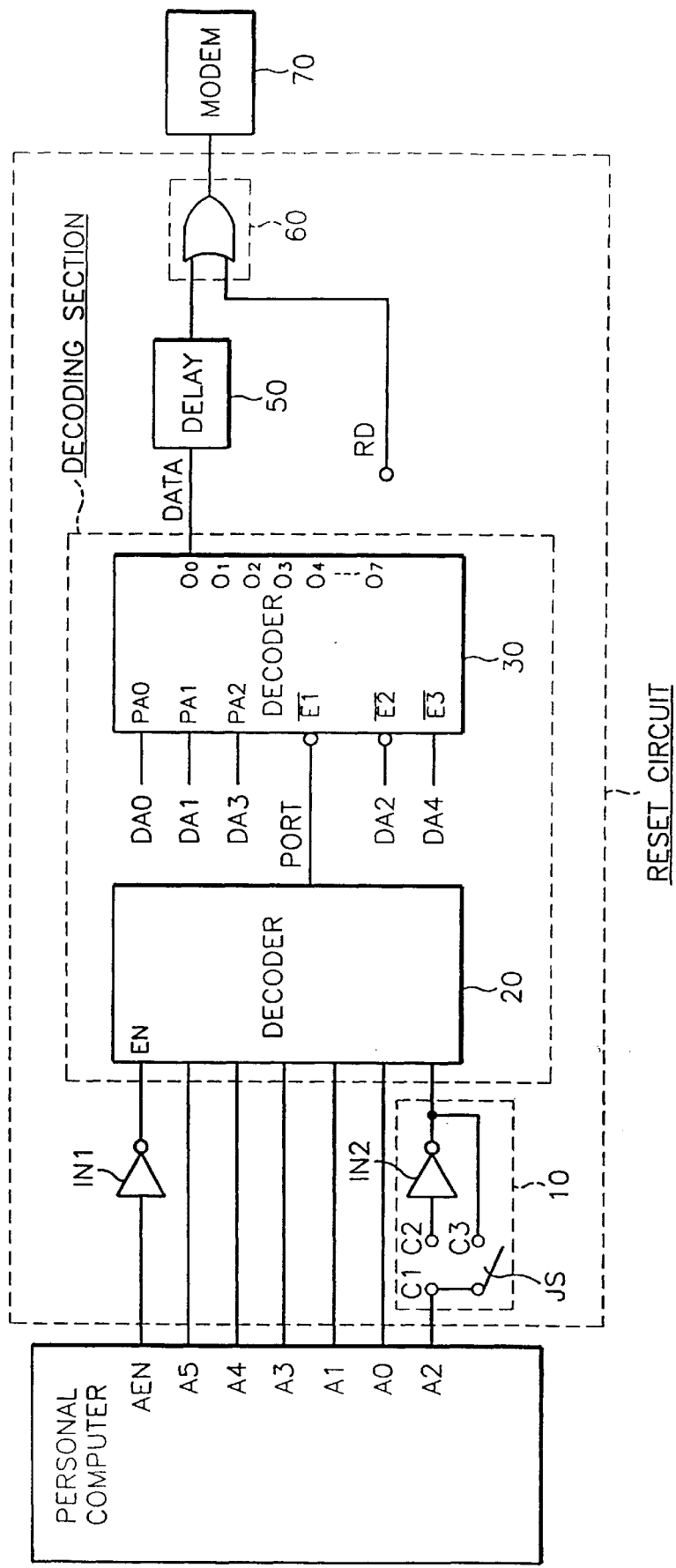
FIG. 2 is a circuit diagram of an especially designed reset circuit for a personal computer having a modem constructed according to a first embodiment of the present invention.

Referring now to FIG. 2, which illustrates an especially designed reset circuit for a computer system having a modem constructed according to the principles of the present invention. This novel reset circuit generates a reset signal in accordance with a specific key entry, which is provided from a modem-supported personal computer. The reset signal is applied to a reset port of the modem 70 which is located inside the personal computer. Then the modem 70 permits a specific additional modem function being performed to be rapidly restored in a basic modem mode for the exchange of digital data. In addition, if there arises an error on an operation system program being performed in the computer, a specific program being performed for the modem is immediately stopped and then rapidly changed back into the basic modem mode.

As shown in FIG. 2, the novel reset circuit includes an address selector 10, a first decoder 20 having input ports coupled to receive a plurality of address signals A0~A5 from the personal computer, a second decoder 30 having input ports PA0~PA2 coupled to receive a plurality of data signals DA0~DA3 from the personal computer, a delay 50, and an OR gate 60 for generating a modem reset signal to the reset port of the modem 70 for resetting operation of the modem 70.

The first decoder 20 serves to decode the address signals A0~A5 to generate a port signal PORT. An enable signal AEN from the personal computer is applied through an inverter IN1 to an enable terminal of the decoder 20. The address signals A0~A5 are provided from the personal computer when a specific key entry is entered by the user, or when there arises an error in an operation system program in the personal computer.

In case that the decoder 20 is enabled in response to logic level of the enable signal AEN from the personal computer, the decoder 20 starts to decode the address signals through the input ports thereof. A specific address signal, for example, the address signal A2, of the address signals A0~A5 is applied through another inverter IN2 to the decoder 20, or applied directly to the decoder 20 by means a jumper switch JS. The jumper switch JS is provided to prevent port conflict. For example, if there is no port conflict in the decoder 20 when the address signal A2 is applied through the inverter IN2 to the decoder, the jumper switch JS need not be used. If there is port conflict in the decoder 20, a contact terminal C1 is electrically connected with a contact terminal C3 by means of the jumper switch JW, so that the address signal A2 is applied directly to the decoder 20. The inverter IN2 and the jumper switch JS constitute an address selector 10 for generating an anti-conflicting port signal. This is because the signal A2 is provided directly to the first decoder 20 by means of the jumper switch JS and is provided through the inverter IN2 to the first decoder 20.

The port signal PORT generated from the first decoder 20 is applied to an enable terminal/E1 of a second decoder 30. This decoder 30 then receives data signals DA0, DA1 and DA3 though input ports PA0~PA2 thereof and decodes the same so as to generate a signal DATA serving as a modem reset signal. In addition to the data signals DA0, DA1 and DA3, data signals DA2 and DA4 are provided from the personal computer and used as information for selecting additional modem functions of the modem 70. The decoder 30 decodes the data signals DA0, DA1 and DA3, and generates several signals through output ports thereof. One of the several signals generated thus is the signal DATA serving as a modem reset signal, and other signals are used to select the additional modem functions of the modem 70.

The modem reset signal DATA is supplied to a delay circuit 50 to be delayed for a constant time. The delayed modem reset signal, as well as another reset signal RD, is provided to input terminals of the OR gate 60 whose output is connected to the reset port of the modem 70. The delay circuit 50 is provided to assure that the modem reset signal corresponds to a specific reset active time of the modem 70. The reset signal RD is provided from a reset switch (not shown), or a personal computer in which a specific program is executed.

As a result, if any one of the above reset signals is applied to the OR gate 60, the modem 70 in response thereto is reset. The additional modem mode being performed for the modem 70 is then stopped and rapidly restored into a basic modem mode for the exchange of digital data.

Also, when there is an occurrence of an error in the execution of an operation system program in a personal computer, a specific program being performed for the modem 70 is stopped immediately to be rapidly restored into the basic modem mode.

Figure 3:
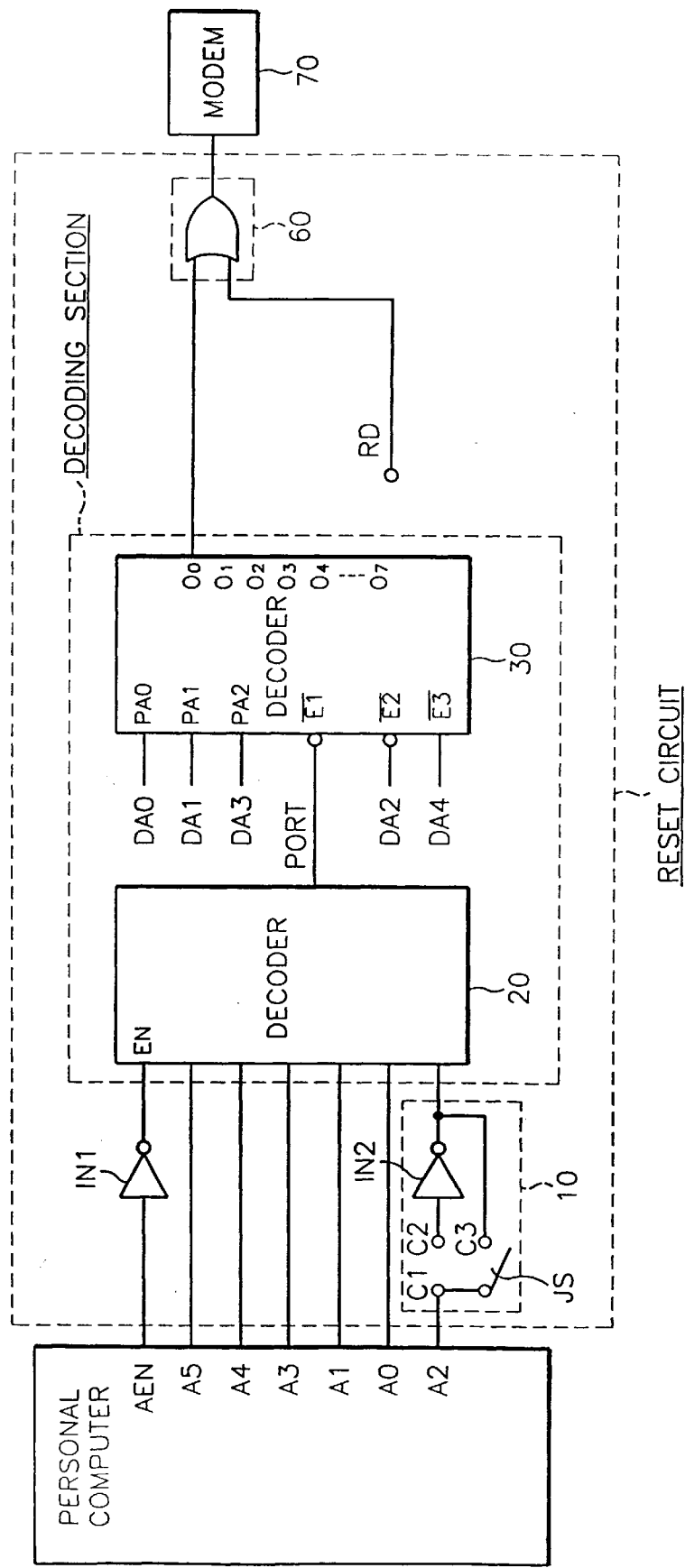
FIG. 3 is a circuit diagram of an especially designed reset circuit for a personal computer having a modem constructed according to a second embodiment of the present invention.

FIG. 3 illustrates another reset circuit for a computer system having a modem constructed according to the principles of the present invention. This reset circuit configuration has the same construction as that of FIG. 2, except that the delay circuit is omitted from the reset circuit of FIG. 2, and hence identical parts are denoted by the same reference numerals and the description thereof is omitted herein for the sake of convenience.

In this second configuration, the second decoder 30 receives a port signal PORT from the first decoder 20 to be enabled. The second decoder 30 then receives data signals DA0, DA1 and DA3 though input ports PA0~PA2 thereof and decodes the same so as to generate a modem reset signal DATA to the modem 70.

The delayed modem reset signal, as well as a reset signal RD provided from a reset switch (not shown) of a personal computer in which a program is executing, is provided directly to input terminals of the OR gate 60 whose output is connected to the reset port of the modem 70. If any one of the above reset signals is applied to the OR gate 60, the modem 70 becomes reset for enabling the additional modem mode being performed for the modem 70 to be rapidly restored into a basic modem mode for the exchange of digital data. Also, when there arises an error on an operation system program being performed in a personal computer, a specific program being performed for the modem 70 is stopped immediately to be rapidly restored into the basic modem mode for the exchange of digital data.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A reset system for a modem operable in one of a basic modem mode for an exchange of digital data and an additional modem mode for an exchange of specific data in a computer system having an external reset switch provided on the modem and the computer system for allowing a user to reset operation of the modem, said reset system comprising:

means for receiving information from said computer system;

decoder means for decoding the information from said computer system to generate a first reset signal; and signal output means having a first input terminal coupled to receive occurrence of said first reset signal, and a second input terminal coupled to receive occurrence of a second reset signal generated from said computer system in response to one operation selected from among a manual reset operation of said external reset switch and an operation of a designated program contained in said computer system, for combining occurrence of said first reset signal and said second reset signal to generate a modem reset signal to a reset portion of said modem for resetting operation of said modem.

2. The reset system of claim 1, further comprised of said decoder means comprising:

a first decoder having input ports coupled to receive address signals from said computer system, for decoding the same address signals to produce an enable signal; and a second decoder having input ports coupled to receive modem function selection signals from said computer system and said enable signal from said first decoder, for decoding the same modem function selection signals upon activation of said enable signal to produce said first reset signal.

3. The reset system of claim 1, further comprised of said signal output means comprising an OR gate for logically combining said first reset signal and said second reset signal to produce said modem reset signal to the reset port of said modem.

4. The reset system of claim 1, further comprising a delay circuit for delaying said first reset signal for synchronizing said modem reset signal with a specific reset active time of said modem.

5. The reset system of claim 1, further comprising an address selector for generating an anti-conflicting port signal in response to reception of a designated one of said address signals generated from said computer system and providing said anti-conflicting port signal to said decoder means upon occurrence of an input port conflict in said decoder means.

6. The reset system of claim 5, further comprised of said address selector comprising a jumper switch for providing said designated one of said address signals directly to said decoder means and an inverter for inverting said designated one of said address signals to be provided to said decoder means.

7. A reset system for a modem operable in one of a basic modem mode for an exchange of digital data and an additional modem mode for an exchange of specific data in a computer system having an external reset switch provided on the modem and the computer system for allowing a user to reset operation of the modem, said reset system comprising:

a first decoder having input ports coupled to receive address signals from said computer system, for decoding the same address signals to produce an enable signal; and a second decoder having input ports coupled to receive modem function selection signals from said computer system and said enable signal from said first decoder, for decoding the same modem function selection signals upon activation of said enable signal to produce said first reset signal; and signal output means having a first input terminal coupled to receive occurrence of said first reset signal, and a second input terminal coupled to receive occurrence of a second reset signal generated from said computer system in response to one operation selected from among a manual reset operation of said external reset switch and an operation of a designated program contained in said computer system, for combining occurrence of said first reset signal and said second reset signal to generate a modem reset signal to a reset portion of said modem for resetting operation of said modem.

8. The reset system of claim 7, further comprised of said signal output means comprising an OR gate for logically combining said first reset signal and said second reset signal to produce said modem reset signal to the reset port of said modem.

9. The reset system of claim 7, further comprising a delay circuit for delaying said first reset signal for synchronizing said modem reset signal with a specific reset active time of said modem.

10. The reset system of claim 7, further comprising an address selector for generating an anti-conflicting port signal in response to reception of a designated one of said address signals generated from said computer system and providing said anti-conflicting port signal to said first decoder upon occurrence of an input port conflict in said first decoder.

11. The reset system of claim 10, further comprised of said address selector comprising a jumper switch for providing said designated one of said address signals directly to said first decoder, and an inverter for inverting said designated one of said address signals to be provided to said first decoder.

12. The reset system of claim 11, further comprised of said signal output means comprising an OR gate for logically combining said first reset signal and said second reset signal to produce said modem reset signal to the reset port of said modem.

13. The reset system of claim 12, further comprising a delay circuit for delaying said first reset signal for synchronizing said modem reset signal with a specific reset active time of said modem.

14. A reset system in a computer system having an external reset switch for allowing a user to reset a modem in the computer system, said reset system comprising:

a first decoder having input ports coupled to receive address signals from a computer system, for decoding the address signals to produce an enable signal;

a second decoder having input ports coupled to receive modem function selection signals from said computer system and said enable signal from said first decoder, for decoding the modem function selection signals upon activation of said enable signal from said decoder to produce said first reset signal; and a logic circuit for generating a modem reset signal to reset operation of said modem by combining said first reset signal and a second reset signal which is generated from said computer system in response to input of either a manual reset operation of said external reset switch or an execution of a designated program contained in said computer system.

15. The reset system of claim 14, further comprised of said logic circuit corresponding to an OR gate for logically combining said first reset signal and said second reset signal to produce said modem reset signal to the reset port of said modem.

16. The reset system of claim 15, further comprised of a delay circuit delaying said first reset signal for synchronizing said modem reset signal with a specific reset active time of said modem.

17. The reset system of claim 14, further comprising an address selector for generating an anti-conflicting port signal in response to reception of a designated one of said address signals generated from said computer system and providing said anti-conflicting port signal to said first decoder upon occurrence of an input port conflict in said first decoder.

18. The reset system of claim 17, further comprised of said address selector comprising a jumper switch for providing said designated one of said address signals directly to said first decoder, and an inverter for inverting said designated one of said address signals to be provided to said first decoder.

19. The reset system of claim 16, further comprising an address selector for generating an anti-conflicting port signal in response to reception of a designated one of said address signals generated from said computer system and providing said anti-conflicting port signal to said first decoder upon occurrence of an input port conflict in said first decoder.

20. The reset system of claim 19, further comprised of said address selector comprising a jumper switch for providing said designated one of said address signals directly to said first decoder, and an inverter for inverting said designated one of said address signals to be provided to said first decoder.

* * * * *